United States Patent [19]

Cante et al.

[11] 3,887,715

[45] June 3, 1975

[54] EDIBLE POLYUNSATURATED EMULSIONS

[75] Inventors: Charles John Cante, Ossining, N.Y.; Victor Moreno, Montreal, Canada

[73] Assignee: General Foods Corporation, White Plains, N.Y.

[22] Filed: June 13, 1974

[21] Appl. No.: 479,022

Related U.S. Application Data

[63] Continuation-in-part of Ser. No. 310,283, Nov. 29, 1972, abandoned.

[52] U.S. Cl. ............... 426/570; 426/602; 426/654; 426/212; 426/657
[51] Int. Cl. .............................................. A23l 1/14
[58] Field of Search .......................... 426/163, 364

[56] References Cited
UNITED STATES PATENTS 3,620,757 11/1971 Ellinger et al. .................... 426/163
3,628,968 12/1971 Noznick ............................ 426/163

*Primary Examiner*—Raymond N. Jones
*Assistant Examiner*—J. M. Hunter
*Attorney, Agent, or Firm*—Thomas R. Savoie; Bruno P. Struzzi

[57] ABSTRACT

Stable aqueous-unsaturated oil emulsions are prepared using the proteose-peptone fraction of bovine milk as the emulsifier. These emulsions are also able to be whipped into stable foams both as is and in the presence of additional ingredients (e.g. sugars, gums, flavors, etc.).

6 Claims, No Drawings

EDIBLE POLYUNSATURATED EMULSIONS

This application is a continuation-in-part of U.S. Patent Application, Ser. No. 310,283, filed Nov. 29, 1972 and now abandoned.

BACKGROUND OF THE INVENTION

It has long been desirable in the food art to find naturally occurring emulsifiers and foaming agents for use in edible emulsions and foams, especially when the glyceride phase of the emulsion consists primarily of an unsaturated triglyceride such as safflower oil, corn oil, etc. In recent years the food industry has attempted to increase its usage of unsaturated oils in place of the saturated fats which have been suggested as one of the dietary factors which may affect blood cholesterol. Additionally the food industry has sought to increase the use of natural emulsifiers, to at least partially replace the chemical, non-nutritive emulsifiers currently used to manufacture stable prepared food products which contain an aqueous emulsion system.

Emulsifiers are commonly used in many food products such as high fat toppings, salad dressings and non-butterfat dairy products. Some prior attempts to rely solely on proteins, which are naturally occurring components of many common foods and which can have very desirable nutritive benefits, as emulsifying agents have not been successful because the lipoproteins, such as those found in egg yolk, affect the flavor of the product, and/or the amount to be added in order to obtain an emulsifying effect is too great. The food industry has, however, made use of proteins, especially sodium caseinate, in combination with chemical emulsifiers as a means for stable oil-water emulsions. It has now, however, become advantageous, from an economic standpoint to replace sodium caseinate, a known proteinaceous emulsifier, with less expensive, on a functional basis, protein materials obtained from products such as whey which have formerly been considered to be waste materials with little economic value. It is now possible, due to this invention, to eliminate chemical emulsifiers in the preparation of stable oil-water emulsions.

SUMMARY OF THE INVENTION

This invention provides a means which enables a water-in-oil or oil-in-water emulsion, containing an unsaturated triglyceride, to be prepared exclusively by means of a protein-aceous emulsifier derived from bovine milk and more particularly from liquid whey. The triglyceride emulsions of this invention are stable over the entire pH range of prepared food products, are able to be whipped into stable foams having overruns well in excess of 100 percent, and are functional even when the emulsion system contains substantial amounts of other ingredients such as sugars, dextrins, texture modifiers, flavors, etc.

The present invention provides a method for preparing emulsions of oil and water containing as the sole effective emulsifier the proteose peptone fraction of cow's milk. It has been found proteose peptone is not a completely satisfactory emulsifier for saturated glycerides and that it will usually be desirable to include one or more of the commercially available chemical emulsifiers (e.g., mixture of mono and diglycerides) into compositions which contain saturated glycerides such as animal or hydrogenated vegetable fats.

Proteose peptone is defined by the Committee on Milk Protein Nomenclature, Classification and Methodology of the Manufacturing Section of the American Dairy Science Association, as reported by Dyson et al., "Nomenclature of the Proteins of Cow's Milk: Third Revision," Journal of Dairy Science, 53:1 (1970) as that portion of the protein system not precipitated by heating at 95° to 100°C for 20 minutes and subsequent acidification to pH 4.7, but precipitated by 12 percent (weight/volume, [w/v] trichloroacetic acid. The proteose-peptone proteins have been found to account for about 18 to 25 percent of the whey proteins and about 4 percent of the total proteins in milk.

The Dyson et al. article sets forth the approximate protein composition of skim milk as:

|  | (percent) |
| --- | --- |
| $a_s$-Casein | 45 to 55 |
| kappa-Casein | 8 to 15 |
| beta-Casein | 23 to 35 |
| gamma-Casein | 3 to 7 |
| alpha-Lactalbumin | 2 to 5 |
| beta-Lactoglobulin | 7 to 12 |
| Blood serum albumin | 0.7 to 1.3 |
| Immunoglobulins | 1.3 to 2.8 |
| Proteose-peptone fraction | 2 to 6 |

Proteose peptone proteins are capable of producing stable oil-water emulsions over the entire volume range, say from 5 to 95 percent oil and 95 to 5 percent water. However, this invention is particularly adapted to producing emulsions having an oil volume fraction of about 0.20 to 0.95 because this yields oil-in-water emulsions which can be whipped into stable foams. Whipped edible emulsions generally have an oil volume fraction of between about 0.20 and 0.50, about 0.35 being the conventional fat level for such products as whipped toppings and desserts.

The proteose peptone emulsifier is normally used at a level of from 0.01 to 2.0 percent, preferably 0.1 to 2.0 percent, by weight of the water present in the oil-water emulsion. As will be readily recognized by those skilled in the art the optimum level of proteose peptone that is used will be dependent upon such factors as the ratio of water to triglyceride, the temperature of the system, the type of triglyceride, the amount and type of other components in the system (e.g., sugar, gums, etc.), and the like. Determination of the appropriate level will, however, be well within the skill of the art.

The proteose peptone emulsifier remains soluble and functional at its isoelectric points and may be freely used in the stabilization of acidified emulsion containing unsaturated fats. In addition the proteose peptone emulsifier appears to exert an antioxidant effect on unsaturated fats thereby increasing the storage stability of unsaturated fat emulsions.

DETAILED DESCRIPTION OF THE INVENTION

The proteose peptone material for use in this invention is preferably obtained from one of the liquid residues obtained from the manufacture of various dairy products, such as the whey liquid produced in the making of cheese. The isolation of the proteose peptone protein fraction from either whole milk or milk fractions is based upon the ability of proteose peptone, unique among the milk proteins, to remain in solution during prolonged heating at about 95°C. and acid conditions of about pH 4.7. The proteose peptone containing liquid resulting from such heat-acid treatments will also contain amounts of the lactose and ash components of milk and it will generally be desirable to reduce the level of these components by various physical and/or chemical separation procedures such as dialysis, ultrafiltration, molecular sieves, chemical precipitation, etc.

Proteose peptone has proven to possess excellent emulsifying properties for preparing stable oil-water emulsions at a level of from about 0.1 to 2.0 percent by weight of the water, especially when the oil phase is used at a volume fraction greater than 0.20.

Proteose peptone fraction of milk is considered to be composed of glycoproteins which exhibit significant surface activity and which are soluble at its isoelectric point. It is speculated that the components of the proteose peptone protein moiety are linear with its hydrophillic and hydrophobic groups distributed along the length of the molecule, and that consequently the protein is able to fit itself to the curvature of the oil droplets in the emulsion. In contrast, the spereical casein molecules can only contact oil droplets at points of tangency and the chemical emulsifier molecules contact the oil droplets at points equivalent to their molecular cross-sectional area. Therefore, on a per molecule basis, proteose peptone is expected and has in fact proven to be a highly efficient emulsifier.

The relative emulsifying and whipping ability of proteose peptone has been demonstrated by the fact that a micellar solution of proteose peptone at its critical micellar concentration (0.21 wt. percent) lowers the surface tension of water at the air-water interface to 47 dynes/cm. while a commercial casein at its critical micellar concentration (0.42 wt. percent) reduces the surface tension to only 53 dynes/cm. Proteose peptone at a concentration of $3.6 \times 10^{-3}$ percent (w/v) in safflower oil reduces the oil/air interfacial tension from 35.71 to 34.57 dynes/cm i.e., a lowering of 1.14 dynes/cm. Casein is insoluble in safflower oil and does not reduce the oil/air interfacial tension. Hence in terms of surface activity at the oil/water interface proteose peptone can be expected to be more active than casein since it is more active at the water/air and oil/air interfaces.

The foamability of aqueous solutions of proteose peptone, as low as 0.002 percent by weight, has been compared to the foamability of aqueous solutions of sodium caseinate and the results are set forth in Tables 1 to 4, all foams being prepared in the same manner. In Table 1 the aqueous protein solutions were used as constituted (i.e. at the natural pH) without any attempt to adjust pH. In Tables 2 to 4, either hydrochloric acid or sodium hydroxide were used to adjust the pH to the desired level. The foamability results have been expressed as expansion ratios — (Volume of foam produced)/(Volume of initial liquid) — on a percent basis.

Table 1

Effect of Protein Concentration on Foamability*

| Concentration (w/v %) | Expansion Ratio | |
|---|---|---|
| | Proteose Peptone | Sodium Caseinate |
| 2.0 | 310 | 300 |
| 0.2 | 270 | 270 |
| 0.02 | 500 | 300 |
| 0.002 | 400 | No foam |

*pH is the natural unadjusted value of the protein in water at the given concentration Table 2

Effect of pH on the Foamability of 2.0 w/v % Protein Solutions

| pH | Expansion Ratio | |
|---|---|---|
| | Proteose Peptone | Sodium Caseinate |
| 8.2 | 210 | 310 |
| 6.9 | 210 | 290 |
| 6.0 | 250 | 280 |
| 5.0 | 280 | 190 |
| 4.0 | 280 | 190 |
| 3.0 | 260 | 290 |

Table 3

Effect of pH on the Foamability of 0.2 WT/vol % Protein Solutions

| pH | Expansion Ratio | |
|---|---|---|
| | Proteose Peptone | Sodium Caseinate |
| 8.0 | 850 | 260 |
| 7.0 | 430 | 270 |
| 6.0 | 400 | 250 |
| 5.0 | 250 | 220 |
| 4.0 | 410 | 300 |
| 3.0 | 250 | 280 |

Table 4

Effect of pH on the Foamability of 0.02 WT/vol % Protein Solutions

| pH | Expansion Ratio | |
|---|---|---|
| | Proteose Peptone | Sodium Caseinate |
| 8.3 | no foam | 270 |
| 7.3 | no foam | 230 |
| 6.0 | no foam | 350 |
| 5.0 | 300 | 300 |
| 4.5 | 400 | no foam |
| 4.0 | 400 | no foam |
| 3.0 | 600 | 270 |

The dual surface active role — emulsifier and foaming agent — of proteose peptone has been demonstrated by the ability of proteose peptone to produce stable foams from oil-water emulsions. It has been found that, as illustrated at Table 5, the amount of foaming is dependent on the amount of proteose peptone present in the system. Again the foamability results have been expressed as expansion ratios. The emulsions consisted of safflower oil (34 percent by volume) and water (66 percent by volume) with varying amounts of proteose peptone expressed in weight percent based on the amount of water present in the emulsion. All of the foams were prepared in the same manner at a temperature of 25°C.

Table 5

| Proteose (weight %) | Expansion Ratio % |
|---|---|
| 0.22 | 220 |
| 0.33 | 300 |
| 0.46 | 350 |
| 0.70 | 385 |

The effect of gums and silicas on the foamed emulsion systems of this invention has been studied and as illustrated below in Table 6 have, as expected, been found to depress the expansion ratio. As illustrated in Table 7, the effect of different whey protein materials which contain proteose peptone, as compared to proteose peptone alone, on the expansion ratio of a basic safflower oil — water-gum system indicates that proteose peptone is more effective when it is the only whey protein present in the system.

In the preparation of the foams evaluated in Tables 6 and 7, the emulsions were first prepared by dissolving the components (except for the safflower oil) in the requisite amount of water at room temperature. The pH was adjusted with either HCl or NaOH (1N), then the appropriate amount of safflower oil was added to the aqueous phase and the composite placed in a water bath at 49±1°C for 2 ½ hours. The pH of all the systems was adjusted to pH 5.5, except that when casein was added the pH was raised to 6.0, since casein is not entirely soluble at pH 5.5. Subsequently, each system was emulsified by shaking for 2 minutes in an Erlenmeyer flask with a Burrell, Model BB, Wrist-Action Shaker at two strokes per second and at room temperature. After emulsification, the systems were rapidly chilled in an ice-salt water bath to 6°C. Each emulsion was then whipped, at room temperature, in a Sunbeam Mixmaster at setting No. 9 for 3 minutes, then at setting No. 5 for 2 additional minutes.

The systems evaluated in Tables 6 and 7 were prepared with commercially available components namely vanilla flavor, sodium caseinate (Land O'Lakes Dairy), Cab-O-Sil HS-5 and M-5 hydrophilic silicas (Cabot Corporation), calcium coprecipitate, 80 percent protein, 60 percent soluble (Crest Foods) and the CC603 gum stabilizer (90 percent dextrose, 8 percent carrageenan HMR, 2 percent guar gum). Also used were whey protein preparations ESSA-15, 50 and 80 (ENRG Co.) containing respectively 15, 50 and 80 percent total protein material of which about 30, 9 and 5 percent respectively is proteose peptone while the remainder is comprised of heat coagulable proteins and non-protein nitrogen. The non-nitrogen portion of these whey preparations is comprised of lactose and ash.

As is seen in the tables proteose peptone is capable of functioning as both an emulsifier and a whipping agent in systems composed of water and unsaturated triglycerides (e.g., safflower oil). Ionic gums and other whey proteins appear to have a deleterious effect on the proteose peptone's properties; consequently these ingredients should be avoided where possible.

The production of some whipped emulsions for food use may require the use of a saturated triglyceride component (e.g., hydrogenated vegetable fats) in order to impart the desired texture and mouthfeel to the product. As previously indicated this will usually necessitate the use of a chemical emulsifier in addition to the proteose peptone, since proteose peptone has not been found to be an efficient emulsifier for saturated glycerides. Generally these emulsions will contain on a volume basis one to two parts oil, one to two parts saturated triglyceride, four parts water and preferably about equal parts oil and saturated fats. The level of proteose peptone should be from about 1 to 2 percent by weight based on the weight of water present in the emulsion and the chemical emulsifiers should be about 1 to 3 percent by weight based on the weight of water.

This invention is further described but not limited by the following examples.

EXAMPLE 1

Ricotta whey having the following composition:

| Composition | | Weight % |
|---|---|---|
| Total Solids | | 7.5 |
| Total Nitrogen | | .14 |
|   Coagulable Nitrogen | .024 | |
|   Non-protein Nitrogen | .045 | |
|   Proteose Peptone Nitrogen | .071 | |
| Lactose | | 6.2 |
| Ash | | .6 |
| Fat | | .37 |

Table 6

| Component | Composition (grams, except as noted) | | | | | | | |
|---|---|---|---|---|---|---|---|---|
| | A | B | C | D | E | F | G | H |
| Water (ml.) | 65 | 65 | 65 | 65 | 65 | 65 | 65 | 65 |
| Safflower Oil (ml.) | 35 | 35 | 35 | 35 | 35 | 35 | 35 | 35 |
| Proteose Peptone | .22 | .22 | .22 | .22 | .22 | .22 | .22 | .22 |
| CC 603 Gum System | — | 1.02 | 1.02 | 1.02 | 1.02 | 1.02 | 1.02 | 1.02 |
| Cab-O-Sil HS-5 | — | — | — | .5 | — | 1.0 | — | — |
| Cab-O-Sil M-5 | — | — | — | — | — | — | .5 | 1.0 |
| Casein | — | — | 1.52 | — | — | — | — | — |
| Calcium Coprecipitate | — | — | — | — | 1.01 | — | — | — |
| Sugar | — | — | — | 28.3 | 28.3 | 28.3 | 28.3 | 28.3 |
| Flavor | — | — | — | 2.3 | — | 2.3 | 2.3 | 2.3 |
| Expansion Ratio | 285–300 | 217–233 | 260 | 100 | 200 | 120 | 100 | 120 |

Table 7

| Component | Composition (grams, except as noted) | | | |
|---|---|---|---|---|
| | A | B | C | D |
| Water (ml.) | 67 | 67 | 67 | 67 |
| Safflower Oil (Ml.) | 33 | 33 | 33 | 33 |
| Proteose Peptone | .22 | — | — | — |
| CC 603 Gum System | 1.02 | 1.02 | 1.02 | 1.02 |
| ESAA-15 (proteose peptone) | — | 4.8 (.216) | — | — |
| ESAA-50 (proteose peptone) | — | — | 2.2 (.20) | — |
| ESAA-80 (proteose peptone) | — | — | — | 5 (.20) |
| Sugar | 32 | 32 | 32 | 32 |
| Expansion Ratio | 220 | 150 | 183 | 183 | was adjusted to pH 6.5 with 1N NaOH and concentrated to 30 percent solids in a flash evaporator at a temperature below 50°C. The concentrate was heated to 90°C for 10 minutes, cooled to room temperature in an ice bath, and the pH was slowly adjusted to 4.5 with 1N phosphoric acid. The concentrate was then centrifuged for 10 minutes at 5,000 G's. The precipitate, comprised primarily of coagulable proteins, was discarded, and the supernatant was subjected to exhaustive dialysis against water at 4°C and then freeze dried. The resulting material had the following composition:

| Component | Weight % |
|---|---|
| Protein | 64.63 |
| Lactose | 14.7 |
| Ash | 3.2 |

EXAMPLE 2

Using a 50 percent by weight protein (proteose peptone) material, prepared in a manner similar to the process set forth in Example 1, whipped topping formulations A, B and C were prepared as follows:

| Ingredient | Weight % | | |
|---|---|---|---|
|  | A | B | C |
| Water | 47.14 | 47.14 | 47.14 |
| Safflower Oil | 25.77 | 12.88 | 12.88 |
| Fat-Wecotop A (hydrogenated vegetable) | — | 12.89 | 12.89 |
| Sucrose | 22.60 | 22.60 | 22.60 |
| Vanilla Extract | 1.61 | 1.61 | 1.61 |
| Protein Material (50% proteose peptone) | .80 | .80 | .80 |
| Emulsifier-Drewpone 60 (polyoxyethylene (20) sorbitan monostearate) | — | .68 | .68 |
| Emulsifier - Drewsorb 60 (sorbitan monostearate) | — | .27 | .27 |
| Stabilizer (carrageenan and guar gum) | .76 | .76 | .76 |

The whipped toppings were prepared by mixing the water, oil and fat together at 160°F and then adding and mixing the protein material. The emulsifiers and stabilizer were melted together at 120°F and then added to the aqueous mixture. The sucrose and vanilla components were then added and the hot mix was passed through a 2-stage homogenizer — 1st stage 2,500 p.s.i., and 2nd stage 500 p.s.i. The homogenized mix was cooled to about 45°F and each mix was identically whipped in a household mixer.

The percent overrun (percent increase in volume upon whipping) for the whipped toppings A, B and C were respectively 225, 225 and 281, and their respective Brookfield viscosity (T-bar, Model HAT) was 32, 34 and 38.

The pH of compositions A and B was 6.5 while C was adjusted to 4.0 by the addition of a small amount of phosphoric acid to the water component.

When sodium caseinate was used in the above formulations in place of the proteose peptone material the formulations either did not whip or the casein curdled in the formulation.

Having thus described the invention what is claimed is:

1. An edible whippable emulsion comprising on a volume basis one to four parts oil, four parts water and a proteinaceous emulsifier consisting essentially of proteose peptone, the proteose peptone being present at a level of from 0.01 to 2.0 percent by weight, based on the weight of water contained in the oil-water emulsion.

2. The emulsion of claim 1 wherein level of proteose peptone is from 0.1 to 2.0 percent.

3. The emulsion of claim 2 wherein the oil volume fraction of the emulsion is about 0.35.

4. An edible whippable emulsion comprising on a volume basis one to two parts oil, one to two parts saturated triglyceride, four parts water, chemical emulsifiers and a proteinaceous emulsifier consisting essentially of proteose peptone, the proteose peptone being present at a level of from about 1 to 2 percent by weight, based on the weight of water present in the emulsion.

5. The emulsion of claim 4 wherein is present about equal parts oil and saturated triglyceride.

6. The emulsion of claim 5 wherein the chemical emulsifier is present at a level of from about 1 to 3 percent by weight based on the weight of water present in the emulsion.

* * * * *